United States Patent
Barbera

(10) Patent No.: US 8,371,757 B2
(45) Date of Patent: Feb. 12, 2013

(54) SEALING DEVICE WITH AN INTEGRATED ENCODER FOR BEARINGS

(75) Inventor: Stellario Barbera, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/330,493

(22) Filed: Dec. 19, 2011

(65) Prior Publication Data

US 2012/0087610 A1    Apr. 12, 2012

Related U.S. Application Data

(62) Division of application No. 11/883,586, filed as application No. PCT/EP2006/050957 on Feb. 15, 2006, now abandoned.

(30) Foreign Application Priority Data

Feb. 15, 2005    (IT) ............................... TO2005A0088

(51) Int. Cl.
*F16C 32/04*    (2006.01)
*F16C 41/04*    (2006.01)

(52) U.S. Cl. ...................................................... 384/448

(58) Field of Classification Search .................. 384/477, 384/484–486; 277/2, 37, 152, 574; 428/332
See application file for complete search history.

(56) References Cited

U.S. PATENT DOCUMENTS

| | | | |
|---|---|---|---|
| 5,230,955 A * | 7/1993 | Diroll et al. .................. | 428/332 |
| 5,383,728 A | 1/1995 | Micca et al. | |
| 5,575,568 A | 11/1996 | Rigaux et al. | |
| 5,713,577 A * | 2/1998 | Lannert et al. ................ | 384/485 |
| 5,756,571 A * | 5/1998 | Moore .......................... | 524/425 |
| 6,065,879 A | 5/2000 | Mitsue et al. | |
| 6,284,360 B1 * | 9/2001 | Johnson et al. ............. | 428/317.7 |
| 6,406,763 B1 * | 6/2002 | Wolf et al. .................... | 428/34.9 |
| 6,682,221 B2 * | 1/2004 | Rutter et al. .................. | 384/448 |
| 6,776,420 B2 | 8/2004 | Vignotto et al. | |
| 2002/0126926 A1 | 9/2002 | Ohtsuki et al. | |
| 2002/0131659 A1 * | 9/2002 | Rutter et al. .................. | 384/486 |
| 2004/0124586 A1 * | 7/2004 | Branchereau ................ | 277/549 |
| 2004/0183702 A1 * | 9/2004 | Nachtigal et al. ............. | 341/16 |
| 2007/0209438 A1 * | 9/2007 | Branchereau .............. | 73/514.39 |

FOREIGN PATENT DOCUMENTS

| | | | |
|---|---|---|---|
| EP | 890752 A2 * | 1/1999 | |
| FR | 2 574 501 | 6/1986 | |
| JP | 62-242130 A | 10/1987 | |
| JP | 9-329614 A | 12/1997 | |

OTHER PUBLICATIONS

Japanese Office Action for corresponding Japanese Patent Application No. 2007-555602 mailed Jan. 17, 2012.

* cited by examiner

*Primary Examiner* — Marcus Charles
(74) *Attorney, Agent, or Firm* — Merchant & Gould P.C.

(57) ABSTRACT

A sealing device is to be fitted at a side of a bearing unit in order to seal a gap (15) between a stationary race (11) and a rotatable race (10) of the bearing unit. The device includes a relatively rigid reinforcing insert (16) of disc-annular shape, and a gasket (17) of relatively soft rubber or elastomeric material, over-moulded or vulcanized onto the insert (16). The gasket forms two opposite peripheral sealing portions (18, 19) intended to perform a static sealing action against the rotatable race (10) and a dynamic sealing action on the stationary race (11), respectively. The insert (16) includes magnetized or magnetizable material for forming, at predetermined angular zones or fields, a sequence of alternate and/or spaced north/south poles, in order to act as an encoder.

3 Claims, 1 Drawing Sheet

SEALING DEVICE WITH AN INTEGRATED ENCODER FOR BEARINGS

BACKGROUND OF THE INVENTION

The present invention refers to a sealing device for bearings with an integrated encoder for detecting relative rotation between the races of a bearing unit.

Sealing devices fitted at the sides of a bearing unit in order to seal the gap between the bearing races are well known. Generally, these sealing devices are comprised of a metal reinforcing insert of disc-annular shape onto which there is over-moulded or vulcanized a gasket made of rubber or soft elastomeric material forming two peripheral sealing portions: an outer peripheral portion mounted on the stationary outer race of the bearing in order to perform a static sealing action against this race, and an inner peripheral portion with one or more dynamic sealing lips for sliding against the inner, rotatable bearing race.

U.S. Pat. No. 5,383,728 discloses a sealing device of the above-mentioned type wherein the conventional metal insert is replaced by a rigid annular insert of plastic polymeric material.

There are also known sealing devices for bearings incorporating a magnetic impulse ring or encoder fixed to a protective metal shield mounted on the rotatable bearing race. See, for example, U.S. Pat. No. 6,776,420. In use, the impulse ring faces a fixed sensor which detects the relative speed of rotation between the outer and inner bearing races.

SUMMARY OF THE INVENTION

The object of the present invention is to provide a light sealing device, involving low manufacturing and assembling costs, allowing to dispose of the conventional metal reinforcing insert and which integrates an impulse ring or encoder for detecting relative rotation between the races of a bearing unit.

This object is accomplished, in accordance with the invention, by a sealing device as defined in the appended claims.

BRIEF DESCRIPTION OF THE DRAWINGS

A few preferred but not limiting embodiments of the invention will now be described, reference being made to the accompanying drawings, in which.

DETAILED DESCRIPTION OF THE PREFERRED EMBODIMENT(S)

Figure 1:
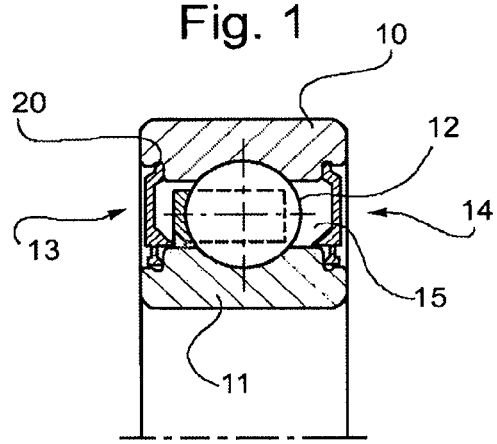
FIG. 1 is an axial cross-sectional view of a bearing unit fitted with a pair of sealing devices.

With reference initially to FIG. 1, a ball bearing unit of conventional design includes a rotatable race 10, a stationary race 11 and a plurality of balls 12 interposed between the races 10 and 11. A sealing device 13, 14 of disc-annular shape is fitted at either opposite side of the bearing in order to seal the gap 15 between the bearing races.

Figure 2:
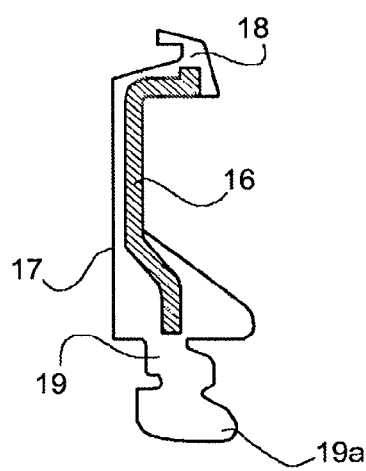
FIGS. 2-5 are enlarged views of four different embodiments of a sealing device according to the invention.
Figure 3:
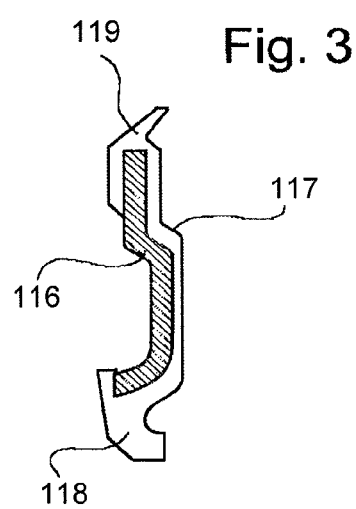
Figure 4:
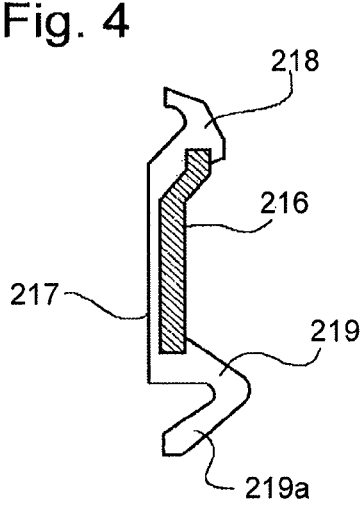
Figure 5:
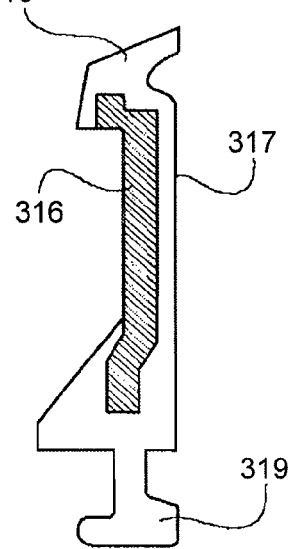

As best shown in FIG. 2, each sealing device comprises a relatively rigid disc-annular insert 16 onto which there is over-moulded or vulcanized a gasket 17 of rubber or soft elastomeric material. The gasket 17 forms—in per se known manner—two opposite peripheral sealing portions 18, 19 intended to perform a static sealing action against the rotatable race 10 and a dynamic sealing action against the stationary race 11, respectively. The peripheral portion 18 is force-fully inserted in a circumferential groove 20 of the rotatable race 10 so as to fix the sealing device to this race. The peripheral portion 19 forms at least one lip 19a performing a sliding or labyrinth sealing action against the stationary race 11.

According to the invention, the insert 16 is made of a matrix of thermoplastic material loaded with a powder of magnetized or magnetizable material, preferably ferrite. Preferably, the thermoplastic matrix has a softening temperature exceeding 180° C. It may for example consist of polyamide (Nylon 66), or polyimide, or polyethylene-ether-sulphonate, or polyetheretherketone (PEEK).

Owing to the above arrangement, the insert 16, besides reinforcing mechanically the sealing device, performs the functions of an impulse ring or encoder for a rotation detecting device associated with the bearing and capable of detecting relative rotation between the races 10 and 11. It will be noted that, contrary to conventional sealing devices, the one according to the present invention is fixable to the rotatable bearing race, in order to be driven for rotation therewith and work as an annular encoder.

Prior to or after over-moulding or vulcanization of the gasket 17, the insert 16 is polarized magnetically so as to form, in predetermined angular zones or fields, a sequence of suitably alternate and/or spaced north/south poles. The magnetic properties are given to the insert 16 by an apparatus that permanently magnetizes the ferrite in predetermined zones with the desired polar orientation.

Once the sealing device is mounted in the bearing unit, the impulse ring is operatively facing an associated sensor or magnetoelectric transducer (not shown) mounted on a fixed part. As the rotatable race 10 rotates, the magnetic flux linked by the transducer varies as the magnetized zones of the insert 16 pass in front of the transducer, which provides electric pulses indicative of rotation data (angular position, speed, acceleration, etc.) of the rotatable race. The electric signals provided by the transducer are transmitted to an electronic processing unit and processed by this in order to obtain information concerning the motion of the rotatable race.

By way of example, FIGS. 2-5 show axial cross-sections of four forms that the insert 116, 216, 316, the elastic gasket 117, 217, 317, the peripheral sealing portions 118, 218, 318 and 119, 219 and 319 and the lip 119a, 219a, 319a may take, in accordance with the geometric features of the bearing onto which the sealing device is to be mounted and the working conditions of the bearing. The insert 116, 216, 316 may be bent and shaped at different points in order to increase its flexural strength and improve the anchoring of the rubber gasket 117, 217, 317.

It is to be understood that the invention is not limited to the embodiments described and illustrated herein, which are to be considered as implemented examples of the sealing device. Rather, the invention is likely to undergo modifications as to the shape and location of parts, constructional and functional details and materials used. For example, the peripheral sealing portions 18, 19 may indifferently be formed on the outer or inner peripheral edges of the sealing device, depending on whether this is intended to be applied to a bearing unit with a stationary outer race and a rotatable inner race, or vice versa.

The invention claimed is:
1. A bearing assembly, comprising:
a bearing unit having a stationary race and a rotatable race defining a gap between the stationary race and the rotatable race;
a sealing and encoding device, fitted at one side of the bearing unit to laterally seal said gap, the sealing and encoding device comprising:

a rigid annular disc shaped reinforcing and encoding insert made of a matrix of plastic material loaded with magnetized or magnetizable material forming a sequence of alternate and/or spaced north/south poles at predetermined angular zones or fields,; and a gasket of rubber or elastomeric material over-molded or vulcanized onto the reinforcing and encoding insert, the gasket forming two opposite peripheral sealing portions, with one of the sealing portions performing a static sealing action against one of the races, and the other of the sealing portions performing a dynamic sealing action against the other of the races.

2. A bearing assembly according to claim 1, wherein the matrix comprises thermoplastic material having a softening temperature exceeding 180° C.

3. A bearing assembly according to claim 2, wherein the thermoplastic matrix is a material chosen from the group consisting of: polyamide (Nylon 66), polyimide, polyethylene-ether-sulphonate, polyetheretherketone (PEEK).

* * * * *